(12) United States Patent
Witty (10) Patent No.: US 9,063,752 B2
(45) Date of Patent: Jun. 23, 2015

(54) SECURITY METHOD

(71) Applicant: Aristocrat Technologies Australia Pty Limited, North Ryde (AU)

(72) Inventor: Nigel Martin Witty, Watthana Nakhon (TH)

(73) Assignee: ARISTOCRAT TECHNOLOGIES AUSTRALIA PTY LIMITED, North Ryde (AU)

(*) Notice: Subject to any disclaimer, the term of this patent is extended or adjusted under 35 U.S.C. 154(b) by 51 days.

(21) Appl. No.: 13/724,310

(22) Filed: Dec. 21, 2012

(65) Prior Publication Data
US 2013/0117551 A1     May 9, 2013

Related U.S. Application Data

(63) Continuation of application No. 12/569,883, filed on Sep. 29, 2009, now abandoned.

(30) Foreign Application Priority Data

Sep. 30, 2008   (AU) .............................. 2008905085

(51) Int. Cl.
| H04L 29/06 | (2006.01) |
| G06F 9/44  | (2006.01) |
| G06F 21/57 | (2013.01) |
| G06F 21/64 | (2013.01) |

(52) U.S. Cl.
CPC ............ G06F 9/4401 (2013.01); G06F 21/575 (2013.01); G06F 21/645 (2013.01)

(58) Field of Classification Search
CPC .... G06F 9/4401; G06F 21/575; G06F 21/645
USPC .......................................................... 713/161
See application file for complete search history.

(56) References Cited

U.S. PATENT DOCUMENTS 6,189,100 B1 *   2/2001   Barr et al. ...................... 713/182
6,484,262 B1 *   11/2002  Herzi .............................. 726/34
(Continued)

FOREIGN PATENT DOCUMENTS

| CN | 101009764 | 8/2007  |
| GB | 2348721   | 10/2000 |

(Continued)

OTHER PUBLICATIONS

United States Patent and Trademark Office, "Final Office Action," issued in connection with U.S. Appl. No. 12/569,883, mailed on Jun. 27, 2012, 15 pages.

(Continued)

*Primary Examiner* — Mohammad W Reza
(74) *Attorney, Agent, or Firm* — Hanley, Flight and Zimmerman, LLC (57) ABSTRACT

A security method for verifying a client device comprising: loading and executing a boot loader at the client device which establishes a connection to a boot compliance server; sending a first cryptographic element from the boot compliance server to the client device; generating a first cryptographic response with the first cryptographic element based on at least part of the boot loader and sending the first cryptographic response to the boot compliance server for verification; and continuing the boot process upon successful verification of the first cryptographic response.

27 Claims, 7 Drawing Sheets

(56) References Cited

U.S. PATENT DOCUMENTS

| | | |
|---|---|---|
| 6,834,351 B1 | 12/2004 | Kabenjian |
| 6,978,385 B1 * | 12/2005 | Cheston et al. ............... 726/18 |
| 7,299,354 B2 | 11/2007 | Khanna et al. |
| 2004/0177265 A1 | 9/2004 | Ice, Jr. et al. |
| 2004/0242328 A1 * | 12/2004 | Blackburn et al. ............ 463/42 |
| 2006/0015717 A1 | 1/2006 | Liu et al. |
| 2006/0129797 A1 | 6/2006 | Durfee et al. |
| 2006/0179293 A1 | 8/2006 | O'Connor et al. |
| 2007/0266120 A1 | 11/2007 | Tallieu et al. |
| 2007/0268917 A1 | 11/2007 | Wong et al. |
| 2008/0028035 A1 | 1/2008 | Currid et al. |
| 2008/0028052 A1 | 1/2008 | Currid et al. |
| 2008/0098100 A1 | 4/2008 | Zimmerman et al. |
| 2008/0140816 A1 | 6/2008 | Burokas et al. |
| 2008/0147830 A1 | 6/2008 | Ridgill et al. |
| 2008/0155075 A1 | 6/2008 | Cromer et al. |
| 2008/0183812 A1 | 7/2008 | Paul et al. |
| 2008/0201571 A1 | 8/2008 | Sethuraman et al. |
| 2010/0122076 A1 | 5/2010 | Witty |
| 2011/0145575 A1 | 6/2011 | Blommaert et al. |

FOREIGN PATENT DOCUMENTS

| | | |
|---|---|---|
| GB | 2442348 | 4/2008 |
| JP | 2002358136 | 12/2002 |
| JP | 2007310508 | 11/2007 |
| KR | 20050002575 | 1/2005 |
| TW | 278199 | 4/2007 |
| WO | 2008046101 | 4/2008 |

OTHER PUBLICATIONS

United States Patent and Trademark Office, "Non-Final Office Action," issued in connection with U.S. Appl. No. 12/569,883, mailed on Dec. 30, 2011, 17 pages.

* cited by examiner

SECURITY METHOD

CROSS-REFERENCE TO RELATED APPLICATIONS

The present application claims the benefit of priority to U.S. patent application Ser. No. 12/569,883, filed on Sep. 29, 2009, entitled "A SECURITY METHOD," and Australian Provisional Patent Application No. 2008905085, filed on Sep. 30, 2008, entitled "A SECURITY METHOD", both of which are herein incorporated by reference in their entireties.

FIELD

The disclosure relates to a security method, a verification system and a client device.

BACKGROUND

Devices having or associated with a high level of security, such as gaming devices which have to meet stringent regulations, often utilize a secure boot chain so that there is a high level of certainty that the device has booted without being tampered with. One prior art technique is to provide a separate device on the board of the device to monitor an early part of the boot sequence to check that the boot loader (or BIOS) has not been tampered with. Further elements in the boot chain then build on the corner stone of the initial part of the boot sequence being secure to conduct further security checks. A problem with this technique is that if there is a need to update the boot loader, it is also necessary to update the monitoring device. There is a need for an alternative security method.

BRIEF SUMMARY

In a first aspect, there is provided a security method for verifying a client device including:
 loading and executing a boot loader at the client device which establishes a connection to a boot compliance server;
 sending a first cryptographic element from the boot compliance server to the client device;
 generating a first cryptographic response with the first cryptographic element based on at least part of the boot loader and sending the first cryptographic response to the boot compliance server for verification; and
 continuing the boot process upon successful verification of the first cryptographic response.

In an embodiment, the method includes:
 sending at least a second cryptographic element to the client device subsequent to the successful verification of the first cryptographic response;
 generating a second cryptographic response with the second cryptographic element based on at least part of the operating system; and
 loading the operating system upon successful verification of the second cryptographic response.

In an embodiment, the client device takes at least one protective action upon unsuccessful verification of the first cryptographic response.

In an embodiment, the first cryptographic element is a first hash key and generating the cryptographic response includes applying a corresponding hash function to the boot loader using the first hash key.

In an embodiment, sending at least a second cryptographic element includes sending a valid second cryptographic response to the client device whereby the client device can verify the operating system without further reference to the boot compliance server.

In an embodiment, the method includes sending a plurality of second cryptographic elements corresponding to respective ones of a plurality of possible operating versions to the client device and determining at the client device a relevant one of the second cryptographic elements to apply.

In an embodiment, establishing a connection includes establishing an encrypted connection.

In a second aspect, there is provided a verification system including:
 a boot compliance server; and
 a client device arranged to load and execute a boot loader at the client device to establish a connection to a boot compliance server, whereafter:
 the boot compliance server sends a first cryptographic element from the boot compliance server to the client device;
 the client device generates a first cryptographic response with the first cryptographic element based on at least part of the boot loader and sends the first cryptographic response to the boot compliance server for verification; and
 the client device continues the boot process upon successful verification of the first cryptographic response.

In an embodiment, the boot compliance server sending at least a second cryptographic element to the client device subsequent to the successful verification of the first cryptographic response;
 the client device generates a second cryptographic response with the second cryptographic element based on at least part of the operating system; and
 the client device loads the operating system upon successful verification of the second cryptographic response.

In an embodiment, the client device takes at least one protective action upon unsuccessful verification of the first cryptographic response.

In an embodiment, the first cryptographic element is a first hash key and the client device generates the cryptographic response by applying a corresponding hash function to the boot loader using the first hash key.

In an embodiment, the boot compliance server sends a valid second cryptographic response to the client device whereby the client device can verify the operating system without further reference to the boot compliance server.

In an embodiment, the boot compliance server sends a plurality of second cryptographic elements corresponding to respective ones of a plurality of possible operating versions to the client device and the client device determines a relevant one of the second cryptographic elements to apply.

In an embodiment, establishing a connection includes establishing an encrypted connection.

In an embodiment, the client device is a gaming device.

In an embodiment, the gaming device is a player tracking module.

In an embodiment, the verification system further includes a boot loader update server adapted to communicate an updated boot loader to the client device, whereafter the client device replaces the current boot loader with the updated boot loader.

In an embodiment, the verification system further includes an operating system update server adapted to communicate an updated operating system to the client device, whereafter the client device replaces the current operating system with the updated operating system.

In a third aspect, there is provided a client device arranged to:

load and execute a boot loader at the client device to establish a connection to a boot compliance server;

receive a first cryptographic element sent from a boot compliance server to the client device;

generate a first cryptographic response with the first cryptographic element based on at least part of the boot loader and send the first cryptographic response to the boot compliance server for verification; and continue the boot process upon successful verification of the first cryptographic response.

In an embodiment, the client device is arranged to:

receive a second cryptographic element to the client device subsequent to the successful verification of the first cryptographic response;

generate a second cryptographic response with the second cryptographic element based on at least part of the operating system; and load the operating system upon successful verification of the second cryptographic response.

In an embodiment, the client device is arranged to take at least one protective action upon unsuccessful verification of the first cryptographic response.

In an embodiment, the first cryptographic element is a first hash key and the client device generates the cryptographic response by applying a corresponding hash function to the boot loader using the first hash key.

In an embodiment, the client device is arranged to receive a valid second cryptographic response to the client device whereby the client device can verify the operating system without further reference to the boot compliance server.

In an embodiment, the client device is arranged to receive a plurality of second cryptographic elements corresponding to respective ones of a plurality of possible operating versions and determine a relevant one of the second cryptographic elements to apply.

In an embodiment, establishing a connection includes establishing an encrypted connection.

In an embodiment, the client device is a gaming device.

In an embodiment, the gaming device is a player tracking module.

In a fourth aspect, there is provided a security method for verifying a client device including:

loading and executing a boot loader at the client device to establish a connection to a boot compliance server;

receiving a first cryptographic element sent from a boot compliance server to the client device;

generating a first cryptographic response with the first cryptographic element based on at least part of the boot loader and sending the first cryptographic response to the boot compliance server for verification; and continuing the boot process upon successful verification of the first cryptographic response.

BRIEF DESCRIPTION OF THE DRAWINGS

Certain exemplary embodiments of the invention will now be described with reference to the accompanying drawings in which.

Features, further aspects, and advantages of the present invention will become apparent from the following description of embodiments thereof, by way of example only, with reference to the accompanying drawings. Also, various embodiments of the aspects described in the preceding paragraphs will be apparent from the appended claims, the following description and/or the accompanying drawings. It should be understood, however, that the present invention is not limited to the arrangements and instrumentality shown in the attached drawings.

DETAILED DESCRIPTION

One example problem with using a secure boot chain technique is that if there is a need to update a boot loader, it is also necessary to update a related monitoring device. There is a need for an improved security method.

Referring to the drawings, there is shown a verification system which has a boot compliance server controller which participates in the verification of a client device, such as a gaming device. Advantageously, the verification system is provided so as to maintain a secure boot sequence while enabling the boot loader and operating system of the client device to be updated by downloading an updated boot loader or updated operating system to the client device. In the example embodiments described below, the client devices are gaming devices at gaming venues which require a high level of trust because of regulatory requirements.

Persons skilled in the art will appreciate that some venues have electronic gaming tables playable by a plurality of players under control of a controller. For the purpose of this specification, such a table should be understood as being within the meaning of "a gaming device". Accordingly, within this specification "gaming device" includes any gaming device adapted to be coupled to a network, for example, a single player, electronic gaming machine arranged to play one or more games, a player tracking module adapted to be fitted to a gaming machine, an interactive video gaming terminal in a server based gaming system, a bonus controller, a jackpot controller, a display server etc.

Figure 1:
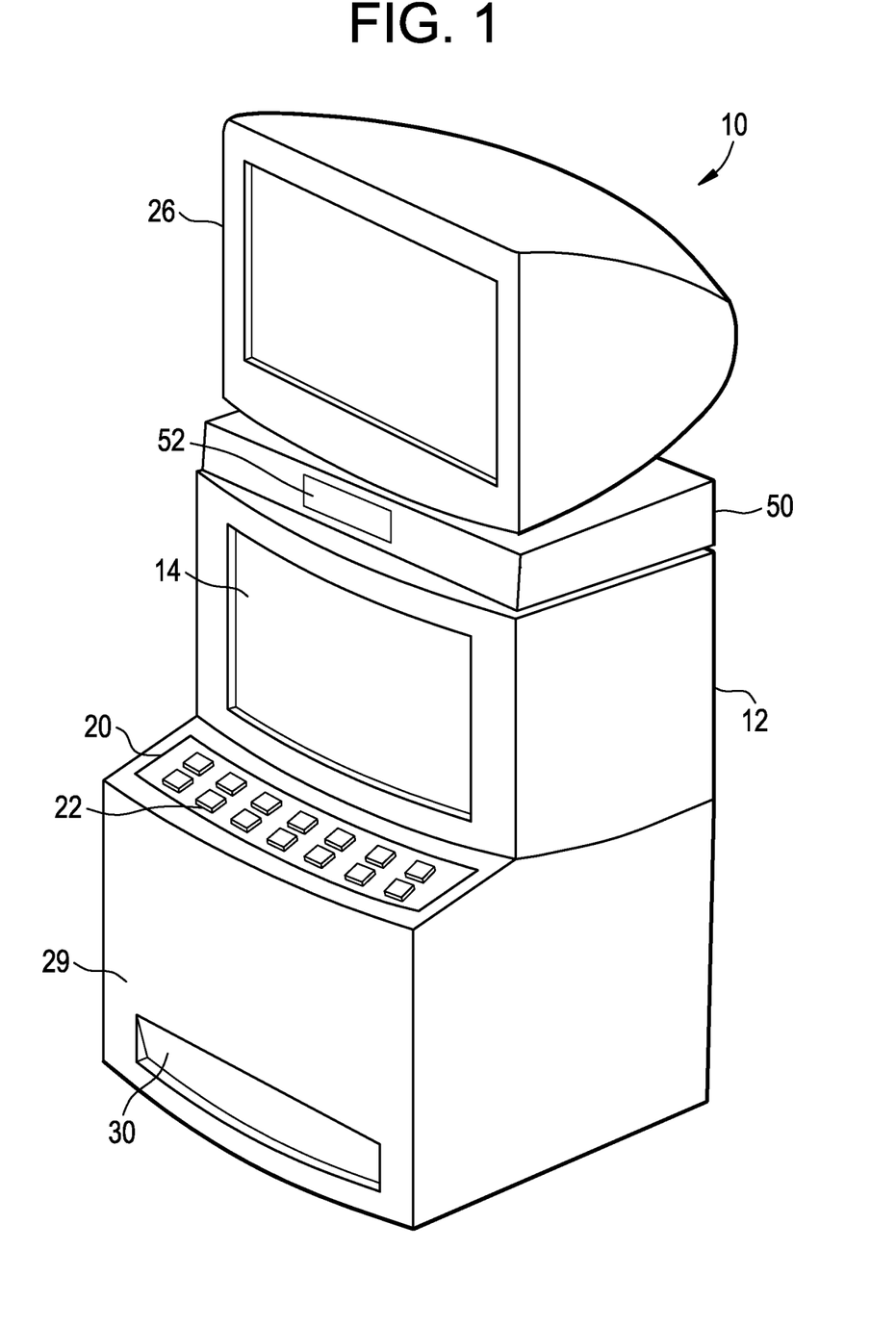
FIG. 1 is a perspective view of a gaming machine.

A gaming device in the form of a typical stand alone gaming machine 10 is illustrated in FIG. 1. The gaming machine 10 includes a console 12 having a display 14 on which is displayed representations of a game that can be played by a player. A mid-trim 20 of the gaming machine 10 houses a bank of buttons 22 for enabling a player to interact with the gaming machine, in particular during game play. The mid-trim 20 also houses a credit input mechanism for example a coin input chute and/or a bill collector 24B. Other credit input mechanisms may also be employed, for example, a card reader for reading a smart card, debit card or credit card.

Artwork and/or information, for example pay tables and details of bonus awards and other information or images relating to the game may be provided on a front panel 29 of the console 12. A coin tray 30 is mounted beneath the front panel 29 for dispensing cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 also includes a display which may be of the same type as the display 14, or of a different type.

Another gaming device in the form of a player tracking module (PTM) 50 (also known as a player marketing module) having a display 52 coupled to the gaming machine 10. One purpose of the PTM 50 is to allow the player to interact with a player loyalty system. The PTM has a magnetic card reader for the purpose of reading a player tracking device in the form of a magnetic swipe card, for example as part of a loyalty program. However other reading devices may be employed and the player tracking device may be in the form of a card, flash drive or any other portable storage medium capable of being read by a reading device.

Figure 2:
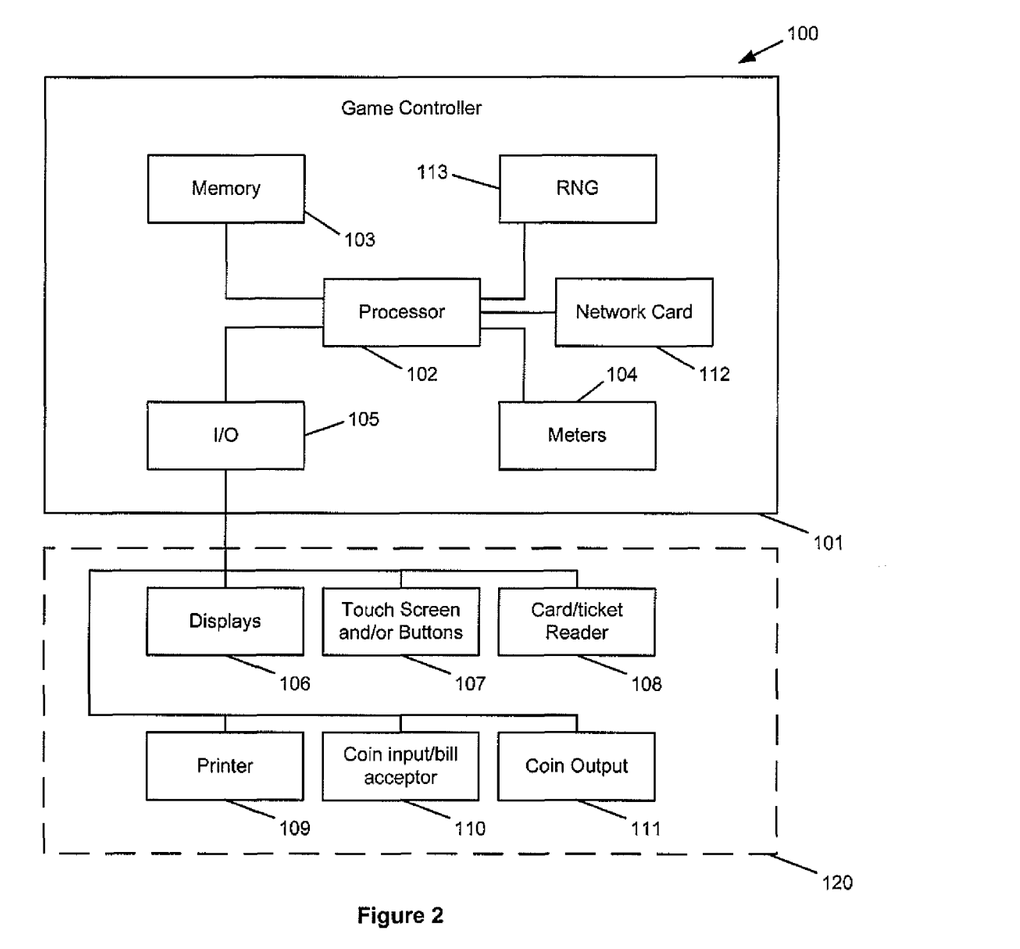
FIG. 2 is a block diagram of a gaming machine.

FIG. 2 shows a block diagram of operative components of a typical gaming machine which may be the same as or different to the gaming machine of FIG. 1.

The gaming machine 100 includes a game controller 101 having a processor 102. Instructions and data to control operation of the processor 102 are stored in a memory 103, which is in data communication with the processor 102. Herein the term "processor" is used to refer generically to any device that can process game play instructions in accordance with game play rules and may include, for example, a microprocessor, microcontroller, programmable logic device or other computational device, a general purpose computer (e.g. a PC) or a server.

Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 2, a player interface 120 includes peripheral devices that communicate with the game controller 101 has one or more displays 106, a touch screen 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a network card 112 to enable the gaming machine to communicate over the network with the boot compliance server. The network card may also send status information, accounting information or other information to a central controller, server or database and receive data or commands from the central controller, server or database.

Figure 3:
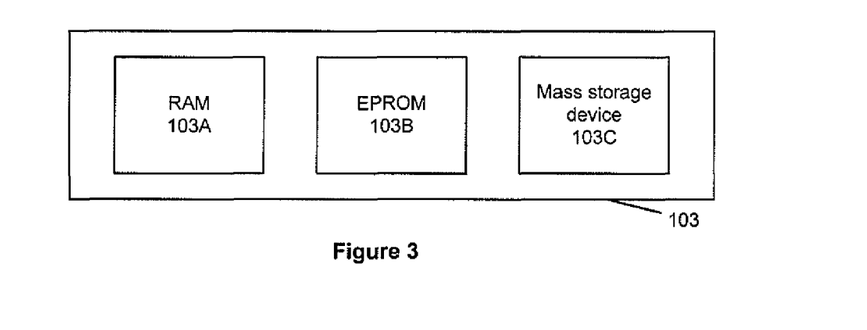
FIG. 3 is a block diagram of the memory of a gaming machine.

FIG. 3 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 4:
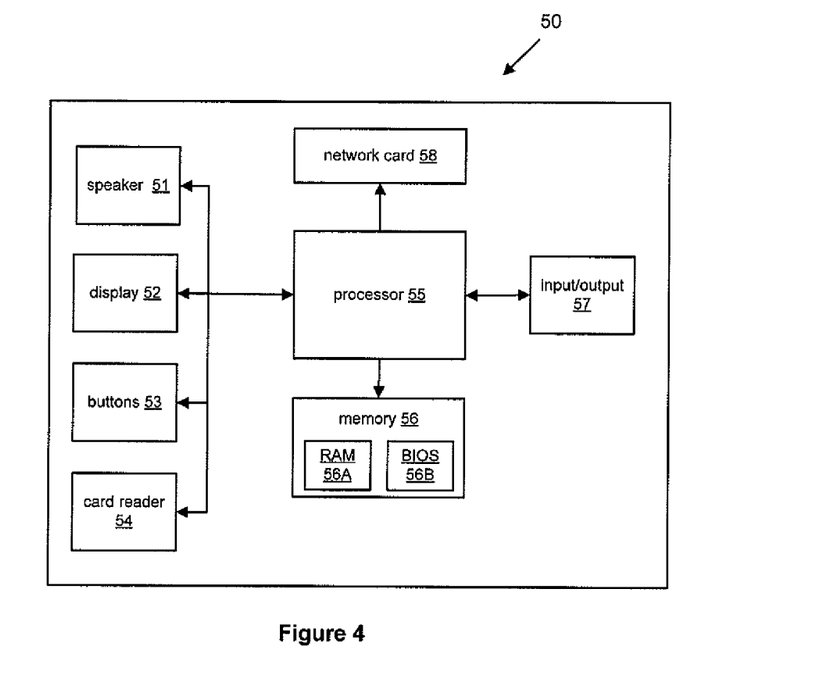
FIG. 4 is a block diagram of a player tracking module of the of an embodiment.

FIG. 4 is a block diagram of a player tracking module 50. The player tracking module (PTM) 50 is coupled via input/output port 57 to a serial input output port of the input/output section 105 of the electronic gaming machine. The PTM 50 has a card reader 54 and a display 52 which may be a touch screen display. The PTM 50 may also have buttons 53 for receiving a player input (at least in embodiments where there is no touch screen display) and a speaker 51. Input received from the card reader 54 is processed by processor 55 based on the data stored in memory 56. The PTM 50 is coupled to the network by network card 58 enabling it to communicate with a loyalty system, the boot compliance server, and the update server. Thus, in the embodiment, the gaming machine 10 communicates with the loyalty system via the PTM. Processor 55 is also arranged to communicate with a gaming machine 10 via input output port 54 to cause locking of the gaming machine in response to an instruction received via the network card 58.

Figure 5:
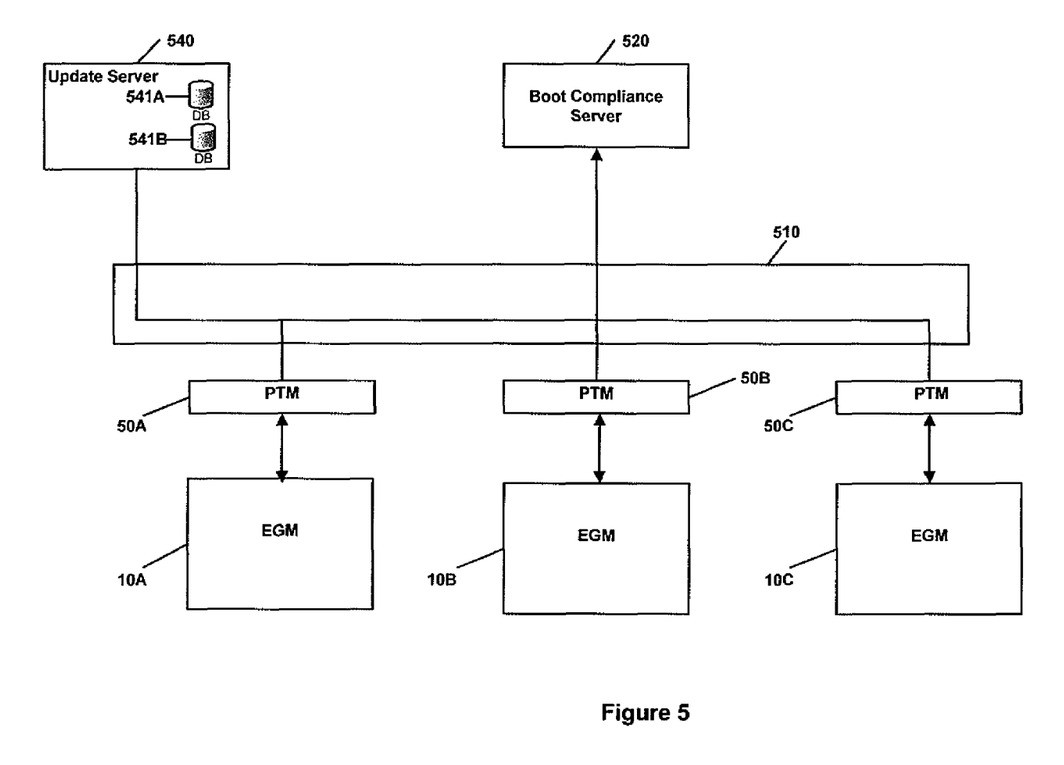
FIG. 5 is a block diagram showing how a plurality of gaming machines are networked and in data communication with a boot compliance server.

FIG. 5 shows an embodiment of a verification system 500 for verifying the boot sequence of a plurality of player tracking modules. A series of electronic gaming machines 10 have respective player tracking modules 50 coupled via communications network 510 to a boot compliance server 520. Persons skilled in the art will appreciate that if the gaming machines 10 have a network card they could be coupled to the network in the same manner. The communications network 510 may be any suitable communications network for example an Ethernet.

Verification system 500 also includes an update server 540 which has a first database 541A storing boot loader updates and the second database 541B storing operating system updates. The update server also stores in databases 541A to 541B the versions of each player tracking modules 50 so that it can control the update process to bring each player tracking machine up to the relevant version. In this manner, the update server provides both a boot loader update server and an operating system update server.

A person skilled in the art will appreciate that terms such as boot loader, boot strap or BIOS are used in different contexts to refer to a set of instructions to be operated by a processor upon start-up in order to initiate operation of the processor. Herein, the term boot loader is used to invoke all of these terms. Persons skilled in the art will appreciate that the actual files included within the boot loader may vary depending on the implementation and generally, the boot loader is split into a series of separate segments. Further, in some implementations some functions may be formed by the operating system rather than the boot loader. Accordingly, it will be appreciated that in many implementations in order to verify the boot loader it will only be necessary to verify a part of the boot loader and it may not be necessary to verify the entirety of it in order to be sure of having a secure platform. For example, in the example described in further detail below it may only be necessary to verify a part of the boot loader having the instructions which enable a connection with the boot compliance server to be made as well as the instructions which have been used as part of the verification process.

Figure 8:
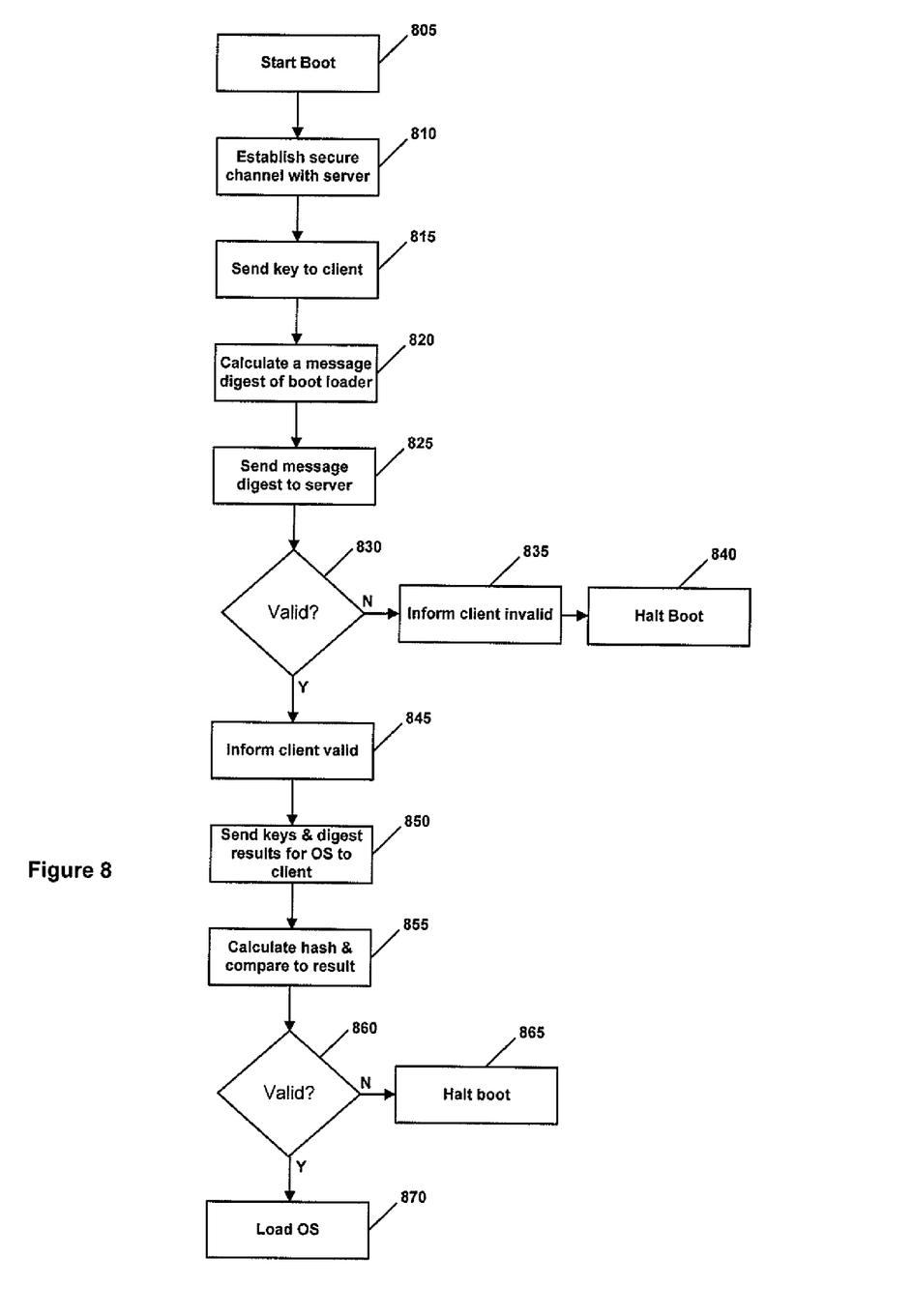
FIG. 8 is a flowchart of a method of an embodiment.

Referring to FIG. 8 the method 80 of the embodiment, involves starting the boot 805 at the player tracking module 50 and early in the boot sequence establishing 810 an Ethernet session to the boot compliance server. This session is established 810 by establishing a secure channel by obtaining the public key of the boot compliance server and encrypting further communications with the public key. Once a secure channel has been established, the boot compliance server 815 sends a cryptographic element in the form of a hash key to the client gaming device to enable it to compute a message digest. Persons skilled in the art will appreciate that if other techniques are employed other types of cryptographic responses could be generated, for example in one embodiment, the verification may be performed using a cyclic redundancy check or the like.

It will be appreciated from the above description that the boot compliance server either knows the version of the operating server run by this client or the gaming client device communicates the boot loader version when establishing a channel with the boot compliance server.

In one example, the key is for the MD5 message-digest algorithm provided by RSA Data Security, Inc. MD5 is a cryptographic hash function which produce a 128 bit hash value. Accordingly, the boot loader program includes the MD5 algorithm to enable the boot loader to calculate 820 the MD5 message digest of the boot loader program and sending 825 the message digest to the boot compliance server. A person skilled in the art will appreciate that other algorithms could be chosen such as RSA or DSA. In this embodiment MD5 is chosen because it enables different keys to be sent to the client each time it is necessary to compute a message digest. Advantageously, the server, determines 830 whether the message digest is valid. If it is invalid the boot compliance server informs 835A the client gaming device that it is invalid and the boot loader halts 840 the boot processor and outputs an appropriate error message on its display.

In the alternative, the boot compliance server informs 845 the client device that the message digest is valid upon which the boot process continues by the boot compliance server sending 850 a plurality of keys and digest results for all operating systems which could be installed on the client gaming device. Generally, there will only be a small number of valid operating systems and it is quicker for the boot compliance server to send the keys and digest results for all valid operating systems rather than initiate a cycle where the server requests the identity of the operating system and sends the relevant key and operating system digest.

The boot loader then calculates a hash 855 using the relevant key and compares this to the relevant result. If it is valid, the boot loader proceeds by loading the operating system 870. Alternatively, if it determined 860 that the result is invalid the boot process halts 865 and an error message is displayed.

An advantage of this process is that as the boot compliance server verifies the boot loader, the boot loader can be changed at the gaming device. Similarly, the operating system can be changed.

Figure 6:
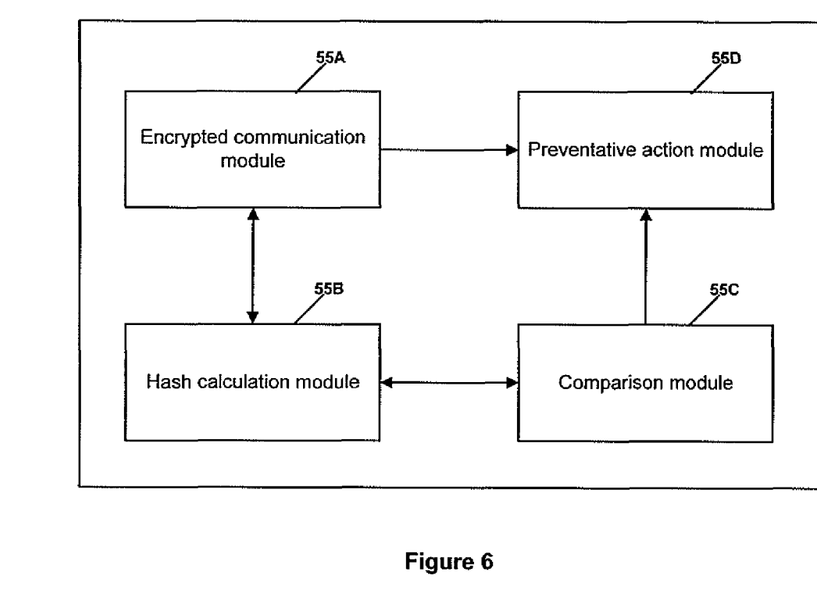
FIG. 6 is a functional block diagram of a player tracking module.
Figure 7:
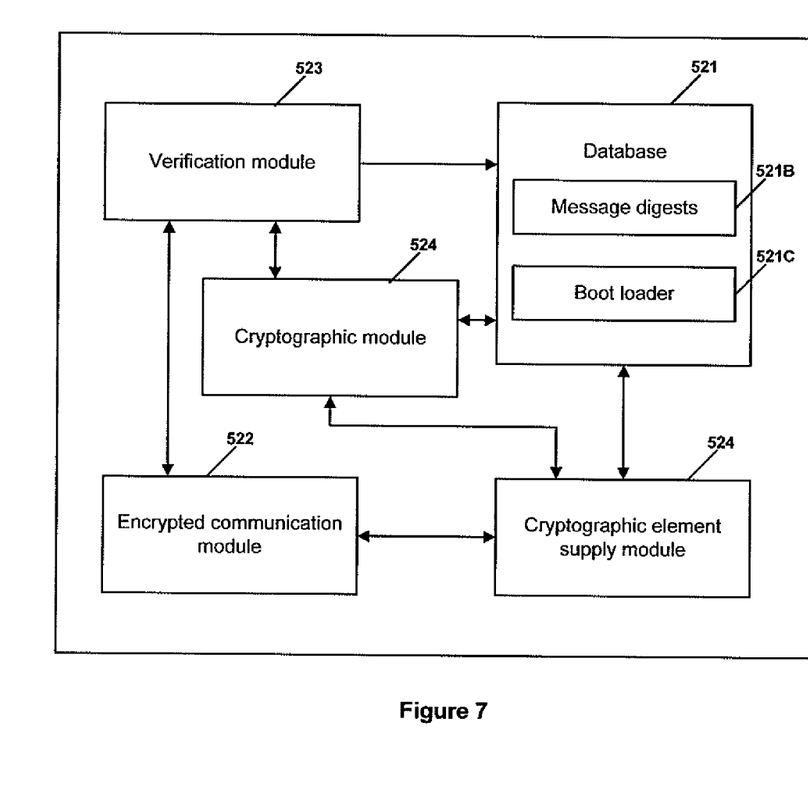
FIG. 7 is a functional block diagram of a boot compliance server.

The modules which are instantiated by the player tracking module and the boot compliance server to carry out the above process are illustrated in FIGS. 6 and 7. The processor 55 of the player tracking module implements an encrypted communication module 55A within the boot loader which is established in order to carry out communications with the boot compliance server 520. It also has a hash calculation module 55B for calculating the message digest to be sent to the server and the case of the first message digest which is calculated and a comparison module 55C which compares the hash to the result sent by the boot compliance server in the case of the hash of the operating system. A preventive action module 55D is activated if either message is invalid. The example given above of a preventative action is to halt the boot process and issue an error message. A person skilled in the art will appreciate that other techniques can also be used to take preventative action, for example by disabling some functions of the player tracking module.

The boot compliance server 520 also has an encrypted communication module 522 and a verification module 523 for verifying any message digest sent to the boot compliance server 520 it has a crypto module 524 for generating any required hashes and database 521 stores digest of the live operating systems and boot loaders. Crypto module 524 generates the keys to be sent via encrypted communication module 522 to the gaming device. To this end a cryptographic element supply module 524 controls supply of the relevant keys.

Persons skilled in the art will appreciate that while hash key results are transmitted in this embodiment, other cryptographic elements could be transmitted in other embodiments to be used to generate a cryptographic result. For example, rather than sending a key, an alternative would be to use a signature or a certificate or the like.

Further aspects of the method will be apparent from the above description of the gaming system. Persons skilled in the art will also appreciate that the method could be embodied in program code. The program code could be supplied in a number of ways, for example on a tangible computer readable medium, such as a disc or a memory (for example, that could replace part of memory 103) or as a data signal (for example, by downloading it from a server).

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The present invention contemplates methods, systems and program products on any electronic device and/or machine-readable media suitable for accomplishing its operations.

Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A security method for verifying and detecting physical tampering of a boot loader in a client gaming machine, the method comprising:
   analyzing the client gaming machine based on stored client gaming machine version information;
   updating at least one of a boot loader and an operating system of the client gaming machine via an update server storing: a) boot loader updates, b) operating system updates, and c) client gaming machine version information;
   loading and executing the boot loader at the client gaming machine which establishes a connection to a boot compliance server;
   sending a first cryptographic element from the boot compliance server to the client gaming machine;
   generating a first cryptographic response with the first cryptographic element based on at least part of the boot loader and sending the first cryptographic response to the boot compliance server for verification; and
   continuing to execute the boot loader of the client gaming machine upon successful verification of the first cryptographic response, wherein following said successful verification the boot loader is configured to load the operating system.

2. A method as claimed in claim 1, comprising:
   sending at least a second cryptographic element to the client gaming machine subsequent to the successful verification of the first cryptographic response;
   generating a second cryptographic response with the second cryptographic element based on at least part of the operating system; and
   loading the operating system upon successful verification of the second cryptographic response.

3. A method as claimed in claim 1, wherein the client gaming machine takes at least one protective action upon unsuccessful verification of the first cryptographic response.

4. A method as claimed in claim 1, wherein the first cryptographic element is a first hash key and generating the cryptographic response comprises applying a corresponding hash function to the boot loader using the first hash key.

5. A method as claimed in claim 2, wherein sending at least a second cryptographic element comprises sending a valid second cryptographic response to the client gaming machine whereby the client gaming machine can verify the operating system without further reference to the boot compliance server.

6. A method as claimed in claim 2, comprising sending a plurality of second cryptographic elements corresponding to respective ones of a plurality of possible operating versions to the client gaming machine and determining at the client gaming machine a relevant one of the second cryptographic elements to apply.

7. A method as claimed in claim 1, wherein establishing a connection comprises establishing an encrypted connection.

8. A verification system comprising:
   a boot compliance server;
   a client gaming machine arranged to load and execute a boot loader at the client gaming machine to establish a connection to a boot compliance server; and
   an update server storing: a) boot loader updates, b) operating system updates, and c) client gaming machine version information the update server configured to update the client gaming machine boot loader and operating system based on the client gaming machine version information, whereafter:
   the boot compliance server sends a first cryptographic element from the boot compliance server to the client gaming machine;
   the client gaming machine generates a first cryptographic response with the first cryptographic element based on at least part of the boot loader and sends the first cryptographic response to the boot compliance server for verification; and
   the client gaming machine continues to execute the boot loader of the client gaming machine upon successful verification of the first cryptographic response, wherein following said successful verification the boot loader is configured to load an operating system.

9. A verification system as claimed in claim 8, wherein:
   the boot compliance server sending at least a second cryptographic element to the client gaming machine subsequent to the successful verification of the first cryptographic response;
   the client gaming machine generates a second cryptographic response with the second cryptographic element based on at least part of the operating system; and
   the client gaming machine loads the operating system upon successful verification of the second cryptographic response.

10. A verification system as claimed in claim 8, wherein the client gaming machine takes at least one protective action upon unsuccessful verification of the first cryptographic response.

11. A verification system as claimed in claim 8, wherein the first cryptographic element is a first hash key and the client device generates the cryptographic response by applying a corresponding hash function to the boot loader using the first hash key.

12. A verification system as claimed in claim 9, wherein the boot compliance server sends a valid second cryptographic response to the client gaming machine whereby the client gaming machine can verify the operating system without further reference to the boot compliance server.

13. A verification system as claimed in claim 9, wherein the boot compliance server sends a plurality of second cryptographic elements corresponding to respective ones of a plurality of possible operating versions to the client gaming machine and the client gaming machine determines a relevant one of the second cryptographic elements to apply.

14. A verification system as claimed in claim 8, wherein establishing a connection comprises establishing an encrypted connection.

15. A verification system as claimed in claim 8, wherein the client gaming machine comprises a player tracking module.

16. A verification system as claimed in claim 15, wherein the verification system is configured to verify a boot sequence of a plurality of player tracking modules.

17. A verification system as claimed in claim 8, wherein the update server further comprises a boot loader update server adapted to communicate an updated boot loader to the client gaming machine, whereafter the client gaming machine replaces the current boot loader with the updated boot loader.

18. A verification system as claimed in claim 8, wherein the update server further comprises an operating system update server adapted to communicate an updated operating system to the client gaming machine, whereafter the client gaming machine replaces the current operating system with the updated operating system.

19. A client gaming machine including a processor and a memory arranged to:
analyze the client gaming machine based on stored client gaming machine version information;
update at least one of a boot loader and an operating system of the client gaming machine via an update server storing: a) boot loader updates, b) operating system updates, and c) client gaming machine version information;
load and execute the boot loader at the client gaming machine to establish a connection to a boot compliance server;
receive a first cryptographic element sent from a boot compliance server to the client gaming machine;
generate a first cryptographic response with the first cryptographic element based on at least part of the boot loader and send the first cryptographic response to the boot compliance server for verification; and
continue to execute the boot loader of the client gaming machine upon successful verification of the first cryptographic response, wherein following said successful verification the boot loader is configured to load the operating system.

20. A client gaming machine as claimed in claim 19, arranged to:
receive a second cryptographic element to the client gaming machine subsequent to the successful verification of the first cryptographic response;
generate a second cryptographic response with the second cryptographic element based on at least part of the operating system; and
load the operating system upon successful verification of the second cryptographic response.

21. A client gaming machine as claimed in claim 19, arranged to take at least one protective action upon unsuccessful verification of the first cryptographic response.

22. A client gaming machine as claimed in claim 19, wherein the first cryptographic element is a first hash key and the client gaming machine generates the cryptographic response by applying a corresponding hash function to the boot loader using the first hash key.

23. A client gaming machine as claimed in claim 20, arranged to receive a valid second cryptographic response to the client gaming machine whereby the client gaming machine can verify the operating system without further reference to the boot compliance server.

24. A client gaming machine as claimed in claim 20, arranged to receive a plurality of second cryptographic elements corresponding to respective ones of a plurality of possible operating versions and determine a relevant one of the second cryptographic elements to apply.

25. A client gaming machine as claimed in claim 19, wherein establishing a connection comprises establishing an encrypted connection.

26. A client gaming machine as claimed in claim 19, wherein the client gaming machine comprises a player tracking module.

27. A security method for verifying and detecting physical tampering of a boot loader in a client gaming machine, the method comprising:
analyzing the client gaming machine based on stored client gaming machine version information;
updating at least one of a boot loader and an operating system of the client gaming machine via an update server storing: a) boot loader updates, b) operating system updates, and c) client gaming machine version information;
loading and executing the boot loader at the client gaming machine to establish a connection to a boot compliance server;
receiving a first cryptographic element sent from a boot compliance server to the client gaming machine;
generating a first cryptographic response with the first cryptographic element based on at least part of the boot loader and sending the first cryptographic response to the boot compliance server for verification; and
continuing to execute the boot loader of the client gaming machine upon successful verification of the first cryptographic response, wherein following said successful verification the boot loader is configured to load the operating system.

* * * * *